C. R. UNDERHILL.
SYSTEM OF ELECTRICAL SIGNALING.
APPLICATION FILED NOV. 5, 1912.
1,149,874.
Patented Aug. 10, 1915.
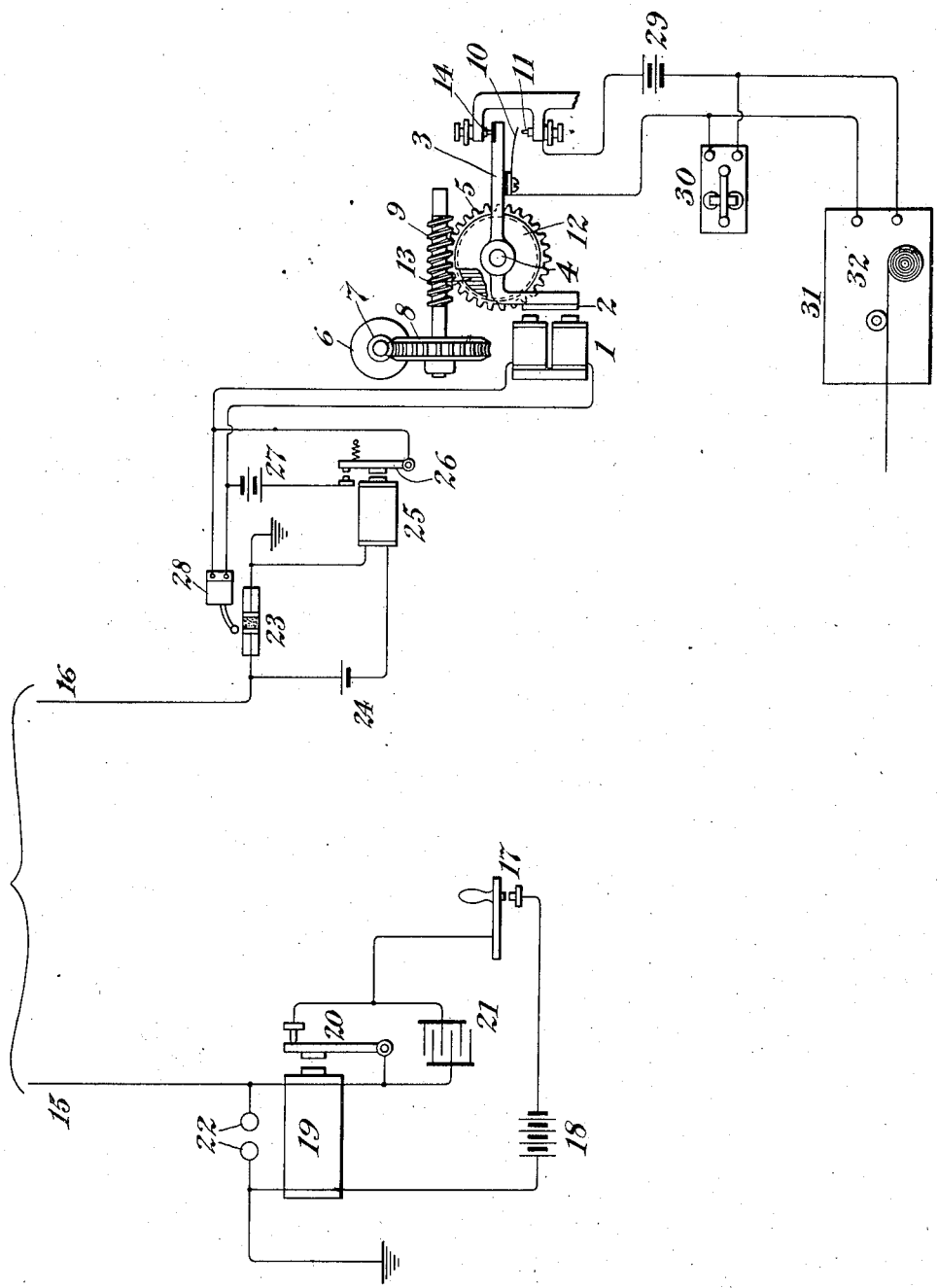

UNITED STATES PATENT OFFICE.

CHARLES R. UNDERHILL, OF NEW HAVEN, CONNECTICUT, ASSIGNOR TO UNDERHILL TELEGRAPH TRANSLATOR COMPANY. OF JERSEY CITY, NEW JERSEY, A CORPORATION OF NEW JERSEY.

SYSTEM OF ELECTRICAL SIGNALING.

1,149,874.      Specification of Letters Patent.      Patented Aug. 10, 1915.

Original application filed August 4, 1904, Serial No. 219,541. Divided and this application filed November 5, 1912. Serial No. 729,549.

*To all whom it may concern:*

Be it known that I, CHARLES R. UNDERHILL, a citizen of the United States, and a resident of New Haven, in the county of New Haven and State of Connecticut, have invented certain new and useful Improvements in Systems of Electrical Signaling, of which the following is a specification.

This invention relates to improvements in a system of electrical signaling, and particularly to a system for converting or translating signals of one kind into modified signals, or signals of another kind. Its principal application is to the communication of intelligence between widely separated points, as for example, in telegraphing through a natural medium, such as the air, earth or water, or through an artificial medium, such as the usual line wires and other conducting elements of a circuit.

In systems of wireless telegraphy in common use, communication from one point to another through a natural medium is ordinarily effected by artificially producing electrical disturbances or impulses of the vibratory type, that is to say, by producing rapidly interrupted electrical vibrations, and transmitting them in the form of signals representing the characters of a determined code. When such signals influence the receiving apparatus, such a receiver responds to each vibratory interruption, as well as to interruptions of longer duration, and when the signals received are registered or recorded by the receiving apparatus the characters or symbols which represent the elements of the code system employed are not recorded as single elements, but are subdivided, this subdivision resulting from the fact that one or more of the elements of the code system employed are in wireless telegraphy usually received in the form of a succession of electrical impulses or elements and not as a single electrical impulse or element. For example, if transmitting the ordinary dots and dashes of the Morse or other telegraphic code, one or both of these electrical elements will always be broken up at the receiving point and will neither be received nor recorded as a continuous signal element, but will always be received and recorded as an interrupted signal element, the dash especially being always recorded as a series of shorter dashes or dots. Even in the ordinary systems of communicating from one point to a distant point without wires, it is desirable to record the signals at the receiving station as continuous signals. It is still more important to operate the receiving instrument in this manner when the message transmitted is converted or translated at the receiving station into other characters, such as letters, figures, etc., of a language. In the patent granted to me August 2, 1904, No. 766,474, I have shown, described and claimed a receiving telegraph instrument capable of converting the characters of an ordinary telegraphic code into language characters; and in a companion application, filed by me August 25, 1904, Serial No. 222,041, I have also shown, described and claimed the application of this instrument and the translating principle embodied therein to the purposes of wireless telegraphy. In the present application it is my intention to disclose and claim a system of electrical signaling in which signal elements are converted into modified signal elements for the purpose of permitting code characters to be sent electrically from one point to another and converted at such second point into characters which correspond to the characters sent to such receiving point, but possess different characteristics.

In carrying this invention into effect, the essential feature of my improved system of electrical signaling is the conversion of signals transmitted by electrical disturbances or electric current of one character into corresponding signals represented by electrical disturbances or electric current of another character, so as to obtain a differentiation between the transmitted and the translated signals. This differentiation may be effected by transmitting in the form of signals complementary signal elements, one of which complementary elements is an electrical impulse, and converting or translating one or both of such complementary elements into modified signal elements, the system illustrated herein being one in which both such elements are modified to convert or translate a series of rapidly interrupted electrical vibrations into one continuous electrical impulse at the receiving point, the length of such continuous electrical impulse corresponding substantially or approximately to the sum of the lengths of the electrical vibrations and vibratory breaks of the series of rapidly interrupted electrical vibrations so transmitted.

The drawing accompanying this specification and forming part of the present application is a diagrammatic view of a wireless telegraph system embodying my present improvements in the art of signaling.

This invention, though applicable to telegraphy over line wires and to other systems of electrical signaling, is illustrated in its application to wireless telegraphy for two reasons: first, because it is especially adapted for recording signals transmitted without wires, and second, because a wireless system represents the most advanced application of the invention. In this and all other systems of signaling to which this invention is applicable, signals of one character are electrically transmitted from one point to another and signals so transmitted are converted or translated into corresponding signals of different character. In a wireless telegraph system the signals sent are usually made up of rapidly-interrupted electrical vibrations, and these signals are usually received and recorded substantially without change, all of the vibratory breaks in the signals transmitted being reproduced at the receiving point both electrically and in the movements of the mechanically-operated parts of the recorder. In my improved system of signaling, however, I make use of means at the receiving station for so modifying the signal elements of the signals received as to convert the transmitted signals into signals of different character, this conversion being effected, when the signals sent are made up of electrical vibrations, by eliminating from the receiving apparatus all the operations ordinarily resulting from vibratory interruptions in the transmitted signals. This modification or elimination of certain signal elements may be effected in various ways, but I prefer to employ at the receiving station means for closing a local circuit each time that an electrical vibration is received and each time that the receiving apparatus responds to a transmitted electrical vibration, and to maintain such local circuit closed during the time interval represented by the vibratory interruption which follows an electrical vibration. By controlling a local circuit at the receiving point in this manner, all vibratory interruptions of the circuit may be eliminated from the signals received before these signals influence the local circuit and by selection all interruptions in the transmitted signals of longer duration than the vibratory interruptions may be reproduced in the local circuit. Thus, for example, if characters of the Morse or other telegraphic code are being transmitted, the dots, dashes, etc., of such code will usually be broken up, and each dash (and sometimes each dot) will consist of a series of smaller dashes or dots separated by breaks, these smaller dashes or dots representing the electrical vibrations transmitted and the breaks representing the vibratory interruptions. Such a series of vibrations and vibratory interruptions constituting a dash will have a determined time-constant, just as in telegraphing with wires the dots and dashes have determined time-constants which differ from each other or from one another; and in wireless telegraphy the time-constant of each dot or dash element of a signal, and the time-constant of each break following a dot or a dash will be substantially the same as in telegraphing over line wires. By providing suitable means for holding a local circuit closed during the time interval represented by a vibratory interruption of an electrical impulse and for causing such local circuit to be opened when the interruption is of longer duration, each series of electrical vibrations and vibratory interruptions representing a dash (or a dot) may be reproduced in the local circuit as a continuous electrical impulse having a time-constant equal or corresponding to the sum of the time-constants of the series of electrical vibrations and vibratory interruptions transmitted.

The means for converting or translating each series of electrical vibrations and vibratory interruptions transmitted from one point to a distant point, usually through a natural medium, into a corresponding signal of a different electrical character, is the principal new element of my improved system of signaling, and more particularly of my improved system of wireless telegraphy. The devices shown herein represent but one of the various means that may be employed for automatically converting or translating electrical signals of one character into corresponding electrical signals of a different character, but such devices are a simple means for accomplishing this result and are capable of effecting such translation in the most desirable manner now known to applicant.

The devices shown comprise a switch which is electrically operated in one direction by the electrical impulse received and is operated in another direction and at a different rate of speed by independent means. The switch shown constitutes in this construction one element of a relay, the armature of the relay being secured to the switch and being attracted each time that the coils of the relay magnet are energized by an electrical vibration. The return movement of this switch is in this case relatively slow and regular, the means for imparting a return stroke to the switch being effective for this purpose only on the interruption of an electrical signal. I prefer to impart a return stroke to the switch by coupling it intermittently to a continuously movable driver, such as a continuously-rotative driver, movable at a substantially constant speed, the switch and the driver being coupled in such a manner that the pull of the magnet will be effective to release the switch instantly from the driver when the magnet is energized, and the rotary driver being so combined with the switch as to begin to operate the latter immediately on the deënergization of the magnet. This will be better understood by referring to the drawing, in which—

1 represents the coils of a relay magnet and 2 the armature thereof, this armature being secured to one arm of an angle-lever, 3, pivoted about the axis, 4, of a rotary driver, 5, which in this construction is a worm-gear forming the terminal member of a train of worm gearing driven from a common driver, 6, which will be rotated in one direction at a substantially constant speed by any suitable means (not shown). The initial member of the train of worm gearing operated by this main driver 6 is a worm, 7, and the intermediate elements are a worm gear, 8, in mesh with the worm 7, and the worm 9 in mesh with the worm gear 5. The object of this gearing is to reduce the speed of the main driver 6 to a very slow rotary movement of the worm gear 5 with which the angle-lever 3 directly coacts. The angle-arm or lever 3 constitutes one element of a switch the main member of which is a spring arm, 10, preferably insulated from the lever 3 and coacting with a contact or binding-post, 11, constituting a terminal of a circuit controlled by the switch-arm 10. In this case the switch is adapted to be coupled to the rotary driver or worm-gear 5 by a frictional connection. The arm 3 has secured thereto a friction-plate, 12, between which and the adjacent face of the worm-gear 5 a friction-disk, 13, may be interposed for the purpose of coupling these parts together, or any other siutable means may be employed for effecting this result. When a frictional connection of this type is used it should always be so adjusted as to permit the friction-plate 12 to slip when the armature 2 is attracted by the relay magnet 1 and also when the long arm of the angle-lever 3 comes in contact with the stop 14. The worm-gear 5 travels slowly in the direction indicated by the arrow, and hence begins to return the armature 2, lever 3 and switch-arm 10 to their normal positions shown in the drawing as soon as the relay magnet 1 is deënergized. This slow and regular return movement of these parts will be variable in extent, and the length of the movement will depend upon the length of the time-constant of the interruption of the signals received. If the break in the circuit is the vibratory interruption which separates successive electrical vibrations, the parts 2, 3 and 10 will have only a partial stroke, and the switch-arm 10 will remain in engagement with the contact 11. If, however, the interruption is of a longer duration, for example the interruption following a dot or a dash of the Morse or other telegraphic code, the parts 2, 3 and 10 will move a greater distance corresponding to the greater length of the time-constant of such break as compared with the time-constant of the vibratory interruption. Usually on the reception of a break following a dot or a dash the worm-gear 5 will carry the parts 2, 3 and 10 with it until the longer arm of the lever 3 is in contact with the stop 14, by which time the contact-arm 10 will have moved away from the contact 11 and will have broken the local circuit.

The devices which control the operation of the relay magnet 1 are or may be substantially the same as those ordinarily embodied in wireless telegraph systems.

15 and 16 represent the usual antennæ at the transmitting and receiving stations respectively. At the transmitting station there will be provided suitable means for producing and transmitting in the form of signals artificially formed electrical disturbances, impulses or vibrations, the devices shown being a transmitting key, 17, connected in circuit with the source of energy or battery, 18, and with an induction-coil, 19, having the usual vibratory circuit-maker-and-breaker, 20, a condenser, 21, and the usual spark-gap between the spheres 22. At the receiving station there is employed a device responsive to electrical disturbances, impulses or vibrations transmitted through a natural medium, the device shown being the usual coherer, 23, connected with the antenna 16 and with ground and controlling a local circuit including a source of energy, usually a single cell, said circuit also having therein a relay magnet, 25, which governs one or more other local circuits. The relay magnet 25 operates a switch, 26, governing an electric circuit containing a source of energy or battery, 27, superior in strength to the source of energy 24, and two controlling devices are illustrated in the circuit of this battery 27. One of these devices is the usual decoherer or tapper, 28, and the other is the relay magnet 1 hereinbefore described, said tapper and relay being connected in parallel in circuit with the battery 27. In all of these circuits, to wit, the circuits controlled by the various sources of energy 18, 24 and 27, the signals are of the same general character, that is to say, they are formed by impulses of signals of varied electrical character, the variation being introduced by the vibratory interruptions separating successive electrical vibrations.

The circuit or circuits controlled by the switch-arm 10 differ from the circuits controlling said switch-arm in that they transmit electrical signals corresponding to but of different character from those traversing the circuits which include the sources of energy 18, 24 and 27. The circuit controlled by the switch-arm 10 and the contact 11 includes a source of energy, 29, and preferably has two or more parallel branches. This circuit governs the operations of one or more devices for properly receiving an incoming message, two such devices being shown herein, one being the ordinary sounder, 30, employed in telegraph systems and the other being a recording apparatus, 31, having a record medium 32, on which the messages may be printed. The recording apparatus 31 is preferably a recording translator of the type shown, described and claimed in the patent granted to me August 2, 1904, No. 766,474 hereinbefore specified, that is to say, it is a receiving telegraph instrument capable of translating the characters of a telegraphic code into the corresponding letters, figures, etc., and printing such language characters on the record medium 32. The various contacts and translating devices at which sparking and fusing are likely to occur should be protected by suitable plantinum or equivalent resistances, in the well-known manner.

In transmitting signals by wireless telegraphy, or in any other manner, in accordance with my invention, complementary signal elements are artificially formed, at least one of these complementary elements being an electrical impulse, and these complementary signal elements are then converted into modified signal elements. Usually these complementary signal elements will be an electrical impulse or vibration and a break or interruption of the impulse, although it is not essential that such complementary elements be of this character. When an impulse is succeeded by a break the signal elements so transmitted are, in the systems described, both modified, the electrical elements of each signal being prolonged and the interruption correspondingly shortened, the prolongation in this case covering a sufficient period of time to eliminate the break or interruption entirely and cause a dot, dash or other signal transmitted as a series of electrical impulses and breaks to be received as a single continuous electrical impulse. Moreover, each electrical signal element transmitted is converted by the receiver into an electrical element of a different form, as well as of a different length, from that transmitted, this being due to the relaying of the signals. When electrically-interrupted vibrations in the form of signals are transmitted through space or other natural medium and relayed and made continuous in the manner described herein, current in the circuit containing the source of energy 29 is capable of operating a sounder 30 and the translating recorder 31 in exactly the same manner that these devices are operated in ordinary line wire telegraph systems and as described in my said patent of August 2, 1904. It will be seen that in this system of wireless telegraphy messages may be transmitted by the ordinary telegrapher's transmitting key through a natural medium, and converted or translated into continuous electrical signals of the ordinary telegraphic code; and that a second conversion or translation will then be effected from the ordinary continuous telegraphic code characters into letters, figures, etc., of language.

The present application is a division of my original application, Serial No. 219,541, filed August 4, 1904.

What I claim is:

1. A telegraph system embodying an electrical transmitting apparatus for transmitting in the form of signals complementary signal elements, and a receiver responsive to said signals and having means controlled in part by elements of said signals and in part by an independent agency forming part of said means and wholly free from the influence of said signals throughout the periods of transmission of said signals for converting said elements into modified signal elements.

2. A telegraph system embodying a transmitting apparatus for transmitting electrical signals of one character, and a receiver responsive to said signals and having means controlled in part by said signals and in part by an independent agency forming part of said means and wholly free from the influence of said signals throughout the periods of transmission of said signals for converting said signals into electrical signals of another character.

3. A telegraph system embodying a transmitting apparatus for transmitting through a natural medium electrical signals of one character, and a receiver responsive to such signals and controlled in part by said signals and in part by an independent agency forming part of said means and wholly free from the influence of said signals throughout the periods of transmission of said signals for converting said signals into electrical signals of another character.

4. An electrical signaling system, embodying means for transmitting from one point to another complementary signal elements at least one of which complementary elements is an electrical impulse, and a receiver responsive to said signal elements and having the following elements, viz.—a switch, means for imparting to said switch two movements which correspond respectively to the complementary signal elements and one of which is variable by an agency forming part of said means and wholly free from the influence of said signals throughout the periods of transmission thereof, and means coöperative with said switch for converting elements of said signals into modified signal elements.

5. A telegraph system embodying a transmitting apparatus for transmitting electrically-interrupted vibrations in the form of signals, and a receiver responsive to said signals and having means controlled in part by said signals and including an independent agency wholly free from the influence of said signals throughout the periods of transmission thereof and having a period of action longer than any interruptions of said signals for converting said signals into electrically-continuous signals.

6. A telegraph system embodying a transmitter, a receiver responsive to electrical signals transmitted thereby, a relay controlled by said receiver and having a switch, a local circuit controlled by said switch for modifying said signals, and means wholly free from the influence of said signals throughout the periods of transmission thereof for imparting a relatively slow return movement to said switch on the deënergization of said relay.

7. A wireless telegraph receiving apparatus, embodying a receiver responsive to electrical vibrations in the form of signals transmitted through a natural medium, a relay controlled by said receiver and having a switch, a local circuit controlled by said switch, and means wholly free from the influence of said signals throughout the periods of transmission thereof for imparting a relatively slow return movement to said switch on the deënergization of said relay.

8. The combination with a coherer responsive to rapidly-interrupted electrical vibrations, of a relay controlled by said coherer and having an armature, and means wholly free from the influence of said signals throughout the periods of transmission thereof for imparting a partial or a complete return stroke to said armature according as the interruption of the circuit is vibratory or of longer duration.

Signed at New Haven in the county of New Haven and State of Connecticut this 28th day of October A. D. 1912.

CHARLES R. UNDERHILL.

Witnesses:
CARRIE L. McGRATH,
WILLIAM D. HENNIG.